(12) United States Patent
Szilagyi

(10) Patent No.: US 7,621,674 B2
(45) Date of Patent: Nov. 24, 2009

(54) HIGH OPTICAL FIBER COUNT CONNECTOR

(75) Inventor: B. Daniel Szilagyi, Naperville, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 11/349,013

(22) Filed: Feb. 7, 2006

(65) Prior Publication Data
US 2006/0177181 A1   Aug. 10, 2006

Related U.S. Application Data

(60) Provisional application No. 60/651,367, filed on Feb. 8, 2005.

(51) Int. Cl.
*G02B 6/38* (2006.01)
(52) U.S. Cl. .............................. 385/71; 385/53; 385/55; 385/70
(58) Field of Classification Search ................... 385/53, 385/55, 70, 71
See application file for complete search history.

(56) References Cited

U.S. PATENT DOCUMENTS

| | | | |
|---|---|---|---|
| 4,834,487 A | 5/1989 | Abendschein et al. | |
| 5,214,730 A | 5/1993 | Nagasawa et al. | |
| 5,619,604 A | 4/1997 | Shiflett et al. | |
| 5,810,048 A | 9/1998 | Zeiner-Gundersen | |
| 5,892,871 A * | 4/1999 | Dahan et al. | 385/86 |
| 6,357,928 B1 | 3/2002 | Haley et al. | |
| 6,565,264 B1 | 5/2003 | Johnson et al. | |
| 6,738,555 B1 * | 5/2004 | Cooke et al. | 385/136 |
| 7,076,144 B2 * | 7/2006 | Loder et al. | 385/134 |
| 2002/0150345 A1 | 10/2002 | Imai et al. | |

FOREIGN PATENT DOCUMENTS

WO    WO 2006/086491 A2    8/2006

OTHER PUBLICATIONS

International Search Report for PCT/US06/004465.

* cited by examiner

*Primary Examiner*—Jennifer Doan
(74) *Attorney, Agent, or Firm*—Timothy M. Morella

(57) ABSTRACT

In one embodiment of the present invention, a connector assembly comprises a body member and a ferrule, disposed therein, and a low profile resilient member, configured to provide a reduced axial dimension when maintained in a compressed state, that biases the ferrule in a direction of a front opening of the body member. In another embodiment of the present invention, the connector assembly comprises a body member and a ferrule disposed therein, and additionally a guide pin holder comprising at least two open members disposed within the body member and in a cooperating relationship with the ferrule. In yet another embodiment, the connector assembly comprises a body member and a ferrule disposed therein, and additionally a boot comprising a first internal surface having a first radius and a second internal surface having a second radius greater than the first radius.

24 Claims, 3 Drawing Sheets

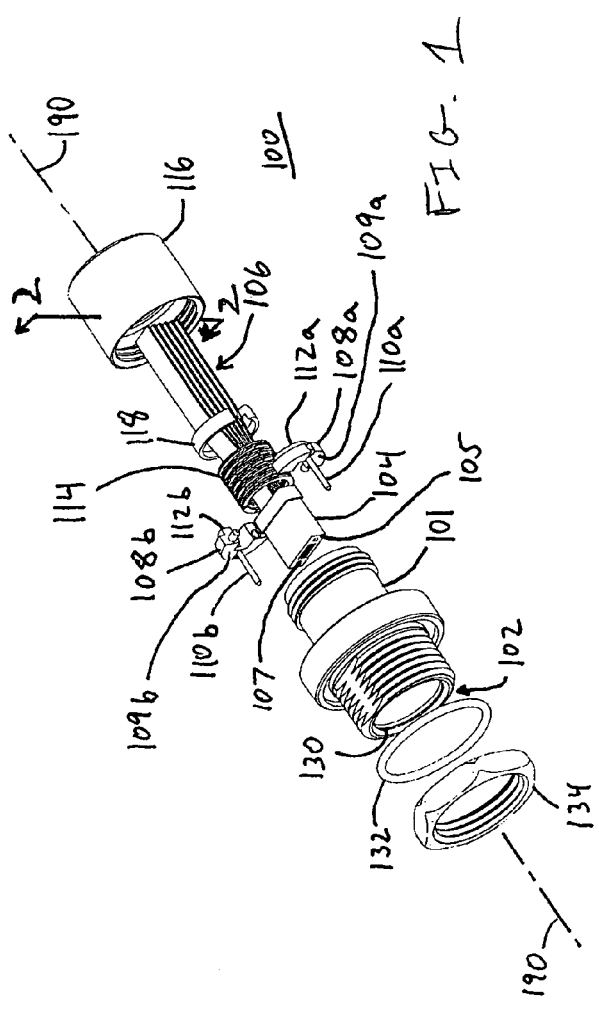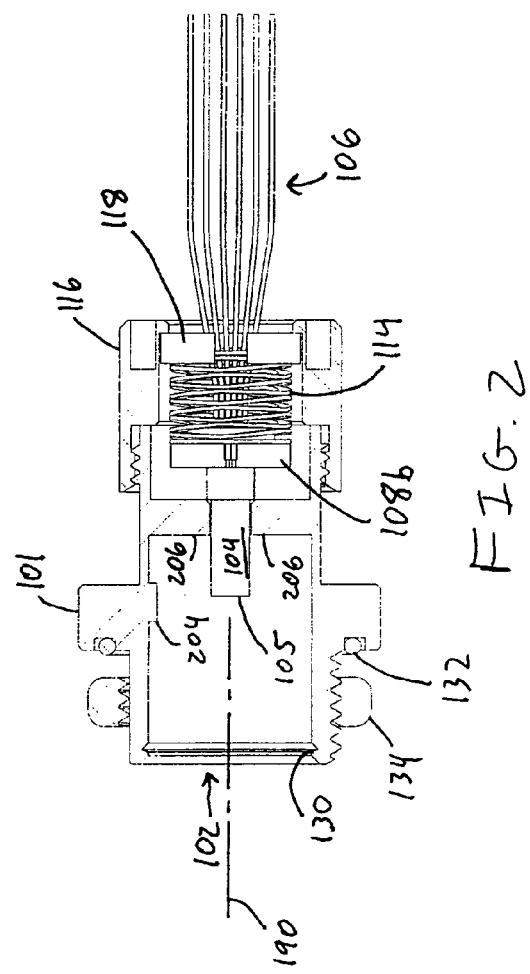

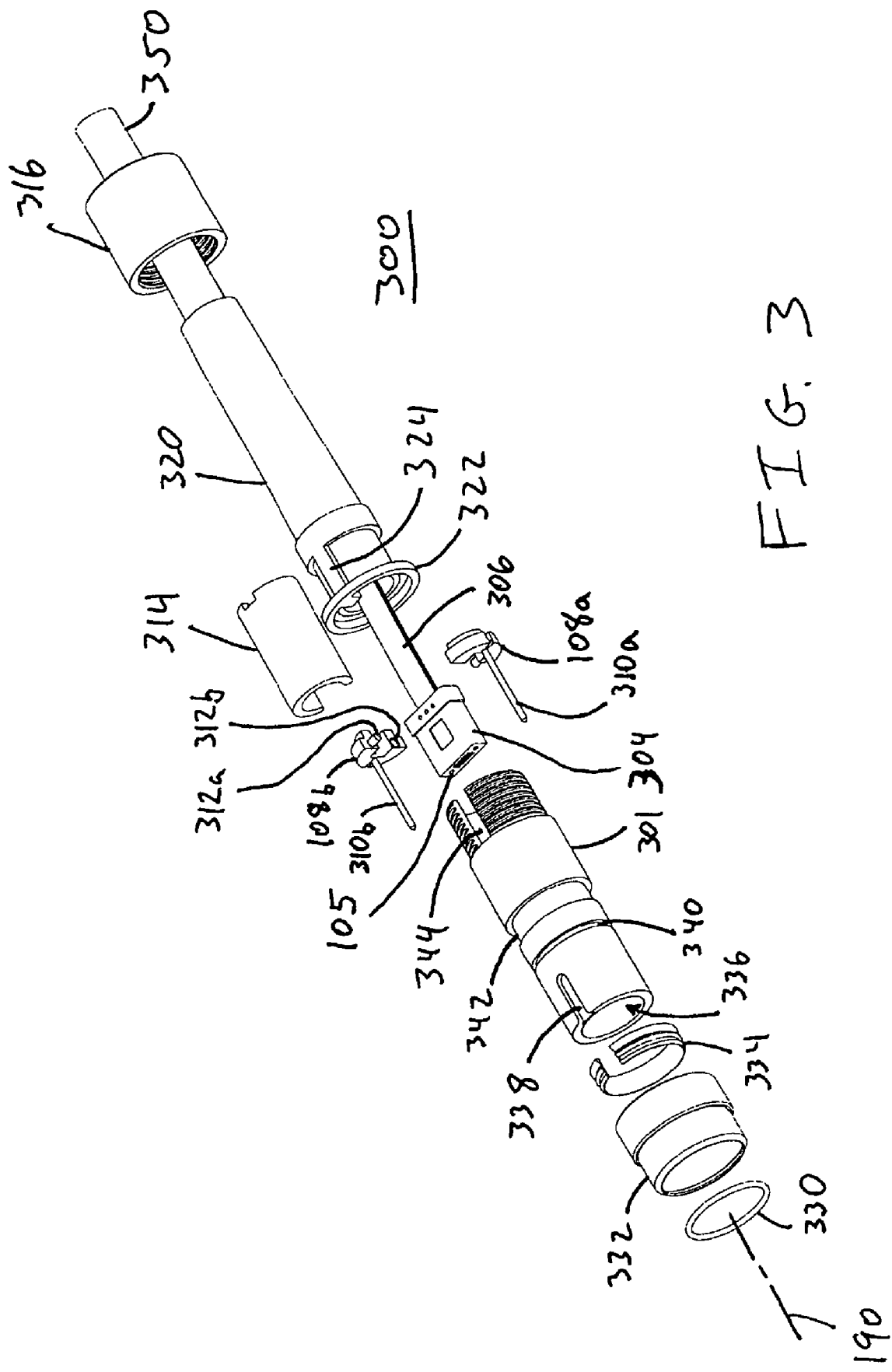

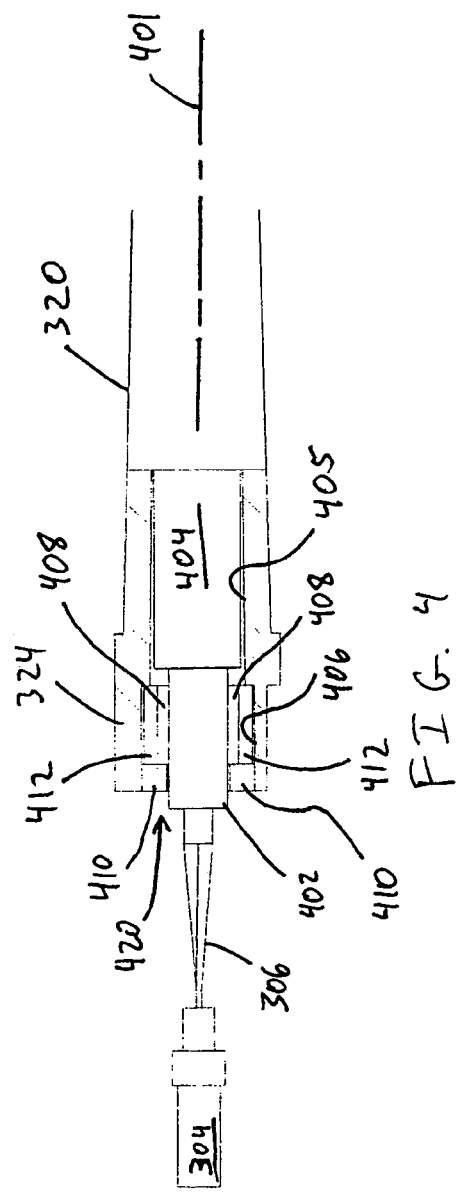
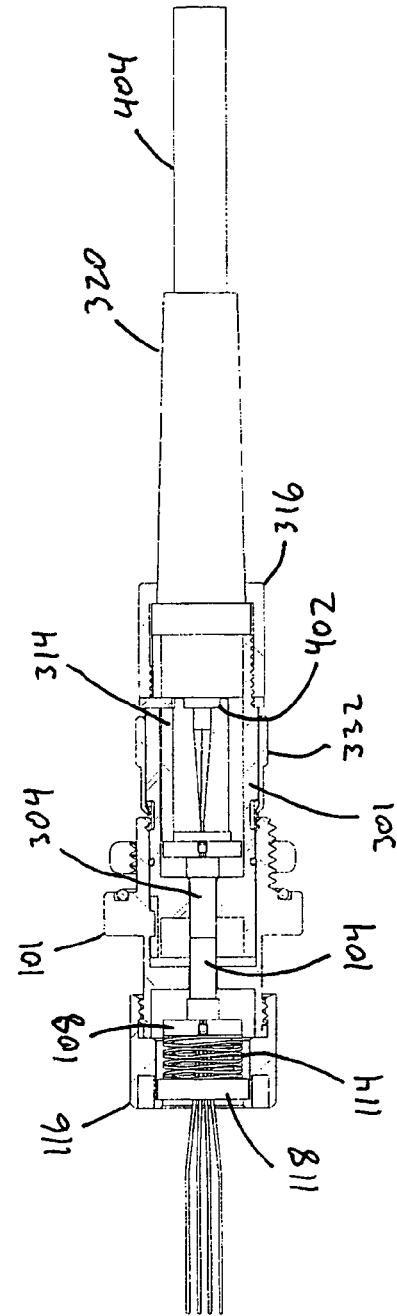

HIGH OPTICAL FIBER COUNT CONNECTOR

REFERENCE TO RELATED APPLICATIONS

This application claims priority of prior U.S. Provisional Patent Application No. 60/651,367 filed Feb. 8, 2005.

FIELD OF THE INVENTION

The invention relates generally to connectors and, in particular, to a high optical fiber count connector.

BACKGROUND OF THE INVENTION

Fiber optic connectors are used to terminate optical fiber cables and to facilitate connection of the cables to other cables or other optic fiber transmission devices. A typical fiber optic connector includes a ferrule which mounts and centers an optical fiber or fibers within the connector. The ferrule may be fabricated, for example, from ceramic or plastic material. A ferrule holder or body member of the connector embraces the ferrule and may be fabricated of such material as molded plastic or aluminum. A spring may be disposed within the body member such that the ferrule is yieldably biased forwardly for engaging another fiber-mounting ferrule of a mating connecting device.

Connectors of the type described above are designed to terminate a relatively small number of optical fibers. For example, the so-called MPO/MTP® connector was designed to terminate up to 24 optical fibers. In practice, however, higher fiber counts are achievable using shrink tubing and other similar methods to transition larger cables into the connector. However, this does not always lead to satisfactory results. For example, current latch designs on MPO/MTP® connectors cannot withstand the required operating temperatures or pull test requirements associated with higher fiber count cables. As such, failure of the connector and/or fiber cables is more likely to occur.

Additionally, prior art connectors tend to be relatively long devices (in the axial direction of the fiber cables being terminated) due to their multiple components. For example, the spring used to forwardly bias the ferrule typically comprises a common coil spring that, in order to provide the necessary amount of biasing force, often has a relatively large axial dimension. Furthermore, in order to terminate the protective outer jacket of a fiber optic cable, thereby maintaining the cable in a fixed relationship with the connector, a crimp sleeve is typically used to provide a compression fit of the strength members and jacket around a receiving surface of the body or housing. Again, this receiving surface tends to increase the over length of the connector.

Accordingly, it would be advantageous to provide a connector for terminating high fiber count cables that does not suffer from the drawbacks described above.

SUMMARY OF THE INVENTION

Briefly, the present invention provides a connector assembly for terminating a large number of optical fibers that overcomes the limitations of prior art connectors. In a first embodiment of the present invention, the connector assembly comprises a body member having a longitudinal axis and a ferrule, disposed within the body member, that terminates the optical fibers. Furthermore, a low profile resilient member is also disposed within the body member such that it biases the ferrule in a direction of a front opening of the body member. Advantageously, the low profile resilient member is configured to provide a reduced axial dimension or operating height when maintained in a compressed state, thereby reducing the axial length of the connector assembly.

In a second embodiment of the present invention, the connector assembly comprises a body member and a fiber-terminating ferrule disposed therein, as described above, and additionally a guide pin holder disposed within the body member and in a cooperating relationship with the ferrule. In particular, the guide pin holder comprises at least two open members each having at least one guide pin disposed substantially perpendicular to a forward surface of the open member. Each guide pin mates with a complimentary opening in the ferrule, preferably at a rearward facing surface of the ferrule, and may extend beyond a front surface of the ferrule for mating with a complementary device. Furthermore, in a preferred embodiment, each open member comprises complimentary mating surfaces for maintaining the guide pin holder around the plurality of optical fibers and for providing a surface for engaging the resilient member. The guide pin holder of the present invention allows rapid and easy assembly of connectors in accordance with the present invention.

In yet a third embodiment of the present invention, the connector assembly comprises a body member and a fiber-terminating ferrule disposed therein, as described above, and additionally a boot disposed at least partially within the body member. The boot comprises a first internal surface having a first radius and a second internal surface, formed in proximity to a front opening of the boot, having a second radius greater than the first radius. The first internal surface is configured to receive a jacket of a fiber optic cable, preferably with an interference fit, and the second internal surface is configured to define a volume that surrounds, and is partially defined by, a shielding member disposed within the jacket. Means are provided within the volume to maintain the shielding number in a fixed position relative to the boot and, therefore, the resulting connector assembly. In this manner, overall axial length of the connector assembly may be further reduced. These and other features of the present invention may be more readily explained with further reference to the drawings.

BRIEF DESCRIPTION OF THE DRAWINGS

The invention will be more readily understood in view of the following description when accompanied by the below figures and wherein like reference numerals represent like elements:

FIG. 1 is an exploded, perspective view of a first connector assembly in accordance with a first embodiment of the present invention;

FIG. 2 is an enlarged, cross-sectional view of the first connector assembly of FIG. 1 taken along line 2-2;

FIG. 3 is an exploded, perspective view of a second connector assembly in accordance with a second embodiment of the present invention;

FIG. 4 is an enlarged, partial cross-sectional view of a boot terminating a fiber cable in accordance with the present invention; and FIG. 5 is a cross-sectional view of the first and second connector assemblies, terminating respective optical fiber cables, when coupled together.

DETAILED DESCRIPTION OF THE PREFERRED EMBODIMENTS

A first connector assembly 100 in accordance with a first embodiment of the present invention is described in greater detail with reference to FIGS. 1 and 2. A circular body member 101 having a front opening 102 receives a ferrule 104 that terminates a plurality of optical fibers 106. Preferably, the body member 101 is fabricated from aluminum or other suitably strong material. Additionally, although a circular body is illustrated, this is not a requirement and body members having other configurations may be equally employed. As shown, the optical fibers 106 may be configured in a ribbon arrangement, although other arrangements may be equally employed. The ferrule 104 is fabricated from materials well known to those having skill in the art. As better illustrated in FIG. 2, flanges 206 are provided within the body member 101 and are configured to receive the ferrule 104 and maintain it in a fixed position relative to a longitudinal axis 190 of the body member 101. In this manner, the ferrule 104 is substantially prevented from moving in a radial direction relative to the longitudinal axis 190 but is allowed to move axially along the axis 190. In a preferred embodiment, the body member 101 is configured such that the front opening 102 is sufficiently distal from a front surface 105 of the ferrule 104 such that the chances of misaligning a mating connector, and thereby damaging the front surface 105, are substantially minimized.

As known in the art, guide pins may be used to very precisely align mating ferrules to thereby ensure high quality optical connections between optical fibers. To this end, a guide pin holder is provided comprising at least two open members 108 each having at least one guide pin 110 disposed substantially perpendicular to a forward surface 109 of each open member 108 and substantially parallel to the longitudinal access 190. The open members 108 may be fabricated from plastic or other suitable material. Likewise, the guide pins are preferably made of stainless steel. Additionally, in a preferred embodiment, openings 107 are provided in the ferrule 104 extending from the front surface 105 to a back surface of the ferrule 104, and configured to receive the guide pins 110 thereby positioning the open members 108 in a fixed position around the plurality of fiber optic fibers 106. Each open member 108 additionally comprises a rearwards-facing biasing surface 112 that is configured to receive one end of a low profile resilient member 114. Advantageously, the guide pin holder in accordance with the present invention may be mated to the ferrule 104 subsequent to polishing of the front face 105, thereby simplifying the assembly process.

When positioned within the connector assembly 100, the low profile resilient member 114 provides a biasing force to the ferrule 104 in a direction of the front opening 102. As a general guide, it is desirable to select the resilient member 114 such that a force of approximately 10 N is provided for every twelve optical fibers terminated within the connector assembly 100, although it may be preferable not to exceed an upper threshold, e.g., 30 N, to account for the possibility of placing an undue amount of force on a single fiber longer than the others. The low profile resilient member 114 is also configured to provide a reduced linear (axial) dimension when maintained in a compressed state. In prior art systems, resilient members used to bias the ferrule in a forward direction typically comprise a coil spring fabricated from wire having a substantially circular cross section. Notably, each coil in such springs has the same radius about a longitudinal axis of the spring. As a result, when such coils are compressed, thereby causing the coils to abut one another, the lowest axial dimension of the spring is limited by the number of coils in the spring and the cross-sectional diameter of the wire. As a consequence, the overall length of the resulting connector tended to be rather large to account for the axial dimension of the resilient member. In contrast, the low profile resilient member 114 is configured such that is provides a substantially reduced linear dimension when maintained in a compressed state. For example, the resilient member 114 illustrated in FIG. 1 comprises a so called wave spring fabricated from steel wire having a flat, rectangular cross section, such as those manufactured by the Smalley Steel Ring Company of Lake Zurich, Ill. In an alternative embodiment, the low profile resilient member 114 may instead comprise a conical spring. A conical spring includes a series of coils of increasingly smaller radial diameter such that, when the conical spring is compressed, the coils nest within each other thereby providing an axial dimension substantially equal to the wire diameter of a single winding.

In order to maintain the ferrule 104, guide pin holder, and low profile resilient member 114 within the body member 101, a retention nut 116 and spacer 118, preferably fabricated from aluminum, are provided. As better illustrated in FIG. 2, the retention nut 116 and spacer 118 form a retention member that, when coupled to the body member 101 via corresponding threads, substantially retain the ferrule 104, guide pin holder and low profile resilient member 114 in a fixed position. In this configuration, the ferrule is prevented from moving in a radial direction away from the longitudinal access 190, but is allowed to move parallel to the longitudinal access 190. Although a separate retention nut 116 and spacer 118 are illustrated in FIGS. 1 and 2, it is possible to combine both into a single, integral unit rather than separate components.

Other features of the body member 101, primarily for the purpose of providing a latching mechanism capable of withstanding the pulling forces typically associated with high optical fiber count cables, are further illustrated in FIGS. 1 and 2. In particular, a connector surface 130 is disposed within an internal surface of the body member 101 and in substantial proximity to the front opening 102. As described in greater detail below, the latching surface 130 engages a complementary surface of a clip spring of a mating connector assembly, maintaining the connectors in substantially fixed relationship to one another. Furthermore, an o-ring 132 and jam nut 134 may be provided as known in the art.

Referring now to FIG. 3, a second connector assembly 300 in accordance with a second embodiment of the present invention is illustrated. In particular, a second body member 301 having a front opening 336 and configured to receive a ferrule 304 is provided. As illustrated in FIG. 5, the second body member 301 is preferably designed to be received within the front opening 102 of the first body member 101 illustrated in FIGS. 1 and 2. Likewise, the second body member 301 is preferably fabricated from aluminum or other suitably strong material. The ferrule 304 is substantially identical to the ferrule. 104 described above relative to FIGS. 1 and 2. Likewise, a guide pin holder comprising at least two open members 108 each having at least one guide pin 310 is also provided. As further illustrated in FIG. 3, each open member 108 comprises mating surfaces 312 that position the guide pin holder around the plurality of optical fibers 306. For example, the mating surfaces 312 provided on each open member 108 may comprise a male surface 312a and a female surface 312b positioned so as to receive a complimentary mating surface from the opposing open member.

As illustrated in FIG. 3, a spacer 314 fabricated from plastic or aluminum is also provided. The spacer 314 is positioned to couple with rearward-facing biasing surfaces of the open members 108, thereby maintaining the ferrule 304 (via the open members 108) in a fixed axial position relative to the front opening 336 when secured by a retention nut 316. The spacer 314 may be used when the ferrule in a complementary connector is yieldingly biased in a forward direction by a resilient member, as described above. However, as those having ordinary skill in the art will recognize, the spacer 314 may be replaced by a smaller spacer in combination with another resilient member or just another resilient member, preferably of the type described above relative to FIGS. 1 and 2.

A boot 320, described in further detail below with reference to FIG. 4, is provided along with a keyed washer 322 which, in combination, cooperate with an opening 344 in the body member 301 to maintain the ferrule 304, guide pin holder and spacer 314 in a fixed position within the body member 301. In particular, a boot key 324 is configured to be received in the opening 344 thereby maintaining alignment of the boot 320 relative to the second body member 301. The boot 320, which is preferably fabricated from rubber, surrounds the outer jacket of a fiber optic cable 350. Furthermore, as described in greater detail below, the boot 320 also maintains the cable 350 in a fixed position substantially restricting axial movement of the cable 350, thereby eliminating the need for a crimp sleeve as in prior art connector assemblies.

Other components that cooperate with various features of the body member 301, primarily for the purpose of providing a latching mechanism capable of withstanding the pulling forces typically associated with high optical fiber count cables, are further illustrated in FIG. 3. In particular, a spring clip 334, preferably fabricated from stainless or spring steel, is maintained within a clip groove 342 of the body member 301 by a stainless steel collar 332 that slides over and mates with the clip ring 334. In a similar manner, a rubber o-ring 330 is also positioned within an o-ring groove 340 also formed on an exterior surface for the body member 301. As known in the art, the spring clip 334, when mated with, for example, the complementary connector 100 illustrated in FIG. 1, engages the connector surface 130 in a locking relationship thereby maintaining the connectors 100, 300 in a fixed relationship relative to one another. Thereafter, the spring clip 334 may be disengaged from the connector surface 130 by sliding the collar 332 backwards, thereby causing the spring clip 334 to compress and disengage the connector surface 130.

Referring now to FIG. 4, a partial cross sectional illustration of the boot 320 is provided. As shown, the boot 320 comprises a first internal surface 405 having a first radius relative to a longitudinal axis 401 of the boot, and a second internal surface 406 having a second radius relative to the axis 401 greater than the first radius. The second internal surface is preferably formed proximal to a front opening 420 of the boot 320. Furthermore, the boot key 324 is illustrated along an external surface of the boot 320. As known in the art, optical fibers 306 are typically encased within a shielding member 402 that, in turn, is further encased in a jacket 404. The jacket 404 is typically configured to provide environmental protection to the optical fibers 306. The shielding member 402 typically comprises a material, such as Kevlar®, having significant tensional strength, thereby preventing damage to the encased optical fibers 306 when the cable is being pulled or otherwise manipulated. The first internal surface 405 is configured to receive the jacket 404 of the cable and, preferably, the first radius is selected so as to provide an interference fit with the jacket 404. The second internal surface 406, in turn, is configured to receive the shielding member 402 such that an annular volume 408 is partially defined by and surrounds the shielding member 402. Although not shown in FIG. 4, the volume 408 provides a space for deploying means for maintaining the shielding member in a fixed position relative to the boot.

For example, in a presently preferred embodiment, an adhesive, preferably a flexible epoxy, is disposed within the volume 408 such that when the adhesive fully cures, the shielding member 402 is fixed in place. Other means for fixing the shielding member 402 (for example, collars that grip the shielding member 402 and maintain an interference fit with the second internal surface 406) may be equally employed. As further illustrated in FIG. 4, a centering member 410 may be provided to substantially center the shielding member 402 within the opening 420. Furthermore, the centering member 410 may comprise one or more legs or extensions 412 to maintain the centering member 410 substantially parallel to the plane defined by the front opening 420. Thus, for example, where epoxy is used to secure the shielding member 402 within the boot 320, the epoxy may first be deployed within the volume 408 and, prior to the epoxy fully curing, the centering member 410 may be inserted in the opening 420 to center the shielding member 402 as desired.

Referring finally to FIG. 5, the complementary connector assemblies 100, 300, when mated together, are further illustrated. In particular, the mating of the connector assemblies 100, 300 provides the desired intimate engagement of the ferrules 104, 304 as biased by the low profile resilient member 114.

While the particular preferred embodiments of the present invention have been shown and described, it will be obvious to those skilled in the art that changes and modifications may be made without departing from the teachings of the invention. For example, the latching mechanism illustrated herein may be replaced using other latching mechanisms know to those having skill in the art. It is therefore contemplated that the present invention cover any and all modifications, variations or equivalents that fall within the spirit and scope of the basic underlying principles disclosed above and claimed herein.

What is claimed is:

1. A connector for terminating a plurality of optical fibers, comprising:
   a body member having a longitudinal axis and a front opening;
   a ferrule having a front surface and configured to maintain the plurality of optical fibers in a fixed position relative to each other, the ferrule being disposed within the body member along the longitudinal axis such that the front surface of the ferrule faces the front opening of the body; and
   a low profile resilient member disposed within the body member along the longitudinal axis to bias the ferrule in a direction of the front opening, wherein the low profile resilient member is configured to provide a reduced linear dimension when maintained in a compressed state and is a wave spring having a rectangular cross-section and at least one flat end surface for biasing said ferrule.

2. The connector of claim 1, further comprising:
   a guide pin holder, disposed within the body member about the longitudinal axis, comprising at least two open members each having at least one guide pin disposed substantially perpendicular to a forward surface of the open member for mating with a complementary opening in the ferrule, each of the at least two open members further comprising complementary mating surfaces for positioning the guide pin holder around the plurality of optical fibers.

3. The connector of claim 2, wherein each of the at least two open members comprises a biasing surface in contact with the low profile resilient member.

4. The connector of claim 1, further comprising:
   a retention member, coupled to the body member and in contact with the low profile resilient member to bias the low profile resilient member in the direction of the front opening.

5. The connector of claim 1, wherein the plurality of optical fibers are disposed within a shielding member that is further disposed within a jacket, the connector further comprising:
 a boot disposed at least partially within the body member along the longitudinal axis, the boot comprising a first internal surface having a first radius and a second internal surface having a second radius greater than the first radius, the second internal surface being disposed in proximity to a forward opening of the boot, wherein the first internal surface is configured to receive the jacket and the second internal surface is configured to provide a volume defined by and surrounding the shielding member; and
 means, disposed within the volume, for maintaining the shielding member in a fixed position relative to the boot.

6. A connector for terminating a plurality of optical fibers, comprising:
 a body member having a longitudinal axis and a front opening;
 a ferrule having a front surface and configured to maintain the plurality of optical fibers in a fixed position, the ferrule being disposed within the body member along the longitudinal axis such that the front surface of the ferrule faces the front opening of the body; and
 a guide pin holder, disposed within the body member about the longitudinal axis, said guide pin holder comprising first and second open members each having at least one guide pin disposed substantially perpendicular to a forward surface of the open member for mating with a complementary opening in the ferrule, each of the first and second open members further comprising first and second complementary mating surfaces, wherein the first mating surface of the first open member engages the second mating surface of the second open member in order to create a closed structure and maintain the guide pin holder around the plurality of optical fibers.

7. The connector of claim 6, wherein at least one guide pin is configured to extend past the front surface of the ferrule.

8. The connector of claim 6, further comprising:
 a resilient member disposed within the body along the longitudinal axis to bias the ferrule in a direction of the front opening;
 wherein each of the first and second open members comprises a biasing surface in contact with the resilient member.

9. The connector of claim 8, wherein the resilient member comprises a low profile resilient member configured to provide a reduced linear dimension when maintained in a compressed state.

10. The connector of claim 8, further comprising:
 a retention member, coupled to the body member and in contact with the resilient member to bias the resilient member in the direction of the front opening.

11. The connector of claim 6, wherein the plurality of optical fibers are disposed within a shielding member that is further disposed within a jacket, the connector further comprising:
 a boot disposed at least partially within the body member along the longitudinal axis, the boot comprising a first internal surface having a first radius and a second internal surface having a second radius greater than the first radius, the second internal surface being disposed in proximity to a forward opening of the boot, wherein the first internal surface is configured to receive the jacket and the second internal surface is configured to provide a volume defined by and surrounding the shielding member; and
 means, disposed within the volume, for maintaining the shielding member in a fixed position relative to the boot.

12. A connector for terminating a plurality of optical fibers disposed within a shielding member that is further disposed within a jacket, comprising:
 a body member having a longitudinal axis, a boot key opening and a front opening for engaging a complementary component;
 a ferrule having a front surface and configured to maintain the plurality of optical fibers in a fixed position relative to each other, the ferrule being disposed within the body member along the longitudinal axis to position the front surface of the ferrule in a mating position to engage the complementary component;
 a boot disposed at least partially within the body member along the longitudinal axis, the boot comprising a first internal surface having a first radius and a second internal surface having a second radius greater than the first radius, the second internal surface being disposed in proximity to a forward opening of the boot, wherein the first internal surface is configured to receive the jacket and the second internal surface is configured to provide a volume partially defined by and surrounding the shielding member, said boot further including a boot key disposed on an external surface thereof for mating with the boot key opening of the body member; and
 an adhesive, disposed within the volume, to maintain the shielding member in a fixed position relative to the boot.

13. The connector of claim 12, further comprising:
 a centering member, disposed substantially between the shielding member and the second internal surface, configured to center the shielding member within the forward opening of the boot.

14. The connector of claim 12, wherein the first radius is configured such that the first internal surface provides an interference fit with the jacket.

15. The connector of claim 12, wherein means for maintaining further comprises an epoxy.

16. The connector of claim 6, wherein the first mating surface of the first open member is a female surface and the second mating surface of the second open member is a male surface.

17. A connector for terminating a plurality of optical fibers of a cable, comprising:
 a body member having a longitudinal axis, a front opening for engaging a complementary component and a rear opening;
 a ferrule having a front surface and configured to maintain the plurality of optical fibers in a fixed position relative to each other, the ferrule being disposed within the body member along the longitudinal axis to position the front surface of the ferrule in a mating position to engage the complementary component;
 a cylindrical spacer having a front end and a rear end along the longitudinal axis and an inner diameter and an outer diameter and a slot extending from the outer diameter through the inner diameter and between the front end and the rear end, the spacer functioning to assist in positioning the ferrule along the longitudinal axis; and
 a rear retention member engaging the body member adjacent the rear opening to removably secure each of said ferrule, said resilient member and said spacer in said connector.

18. The connector of claim 17, further including a low profile resilient member positioned along the longitudinal axis to bias the ferrule in a direction towards the mating component upon mating with said mating component and wherein said cylindrical spacer is stepped to define a shoulder that engages the resilient member.

19. The connector of claim 17, wherein said body member includes a threaded section adjacent said rear opening and said rear retention member includes a threaded portion dimension to engage the threaded section of said body member to permit said retention member to be removably secured to said body member.

20. The connector of claim 17, wherein said rear retention member has a shoulder to engage the cylindrical spacer.

21. The connector of claim 20, wherein said rear retention member has a stepped inner surface to define the shoulder that engages said cylindrical spacer.

22. The connector of claim 17, wherein said connector further includes a boot fixed to the cable and engages said cylindrical spacer and said rear retention member has a shoulder to engage a portion of the boot.

23. The connector of claim 17, wherein said ferrule has a length in the axial direction and said cylindrical spacer is longer in the axial direction than said length of said ferrule.

24. The connector of claim 17, wherein said ferrule has a length in the axial direction and said cylindrical spacer is shorter in the axial direction than said length of said ferrule.

* * * * *